UNITED STATES PATENT OFFICE.

ROBERT GANS, OF PANKOW, NEAR BERLIN, GERMANY, ASSIGNOR TO J. D. RIEDEL AKTIENGESELLSCHAFT, OF BERLIN, GERMANY, A CORPORATION OF GERMANY.

PROCESS OF MAKING HYDRATED ALUMINO-SILICATES OR ARTIFICIAL ZEOLITES.

13,691. Specification of Reissued Letters Patent. Reissued Feb. 24, 1914.

No Drawing. Original No. 914,405, dated March 9, 1909, Serial No. 368,366. Application for reissue filed October 21, 1911. Serial No. 656,051.

*To all whom it may concern:*

Be it known that I, Dr. ROBERT GANS, a subject of the German Emperor, residing at 12 Parkstrasse, Pankow, near Berlin, Germany, have invented a certain new and useful Process of Making Hydrated Alumino-Silicates or Artificial Zeolites, of which the following is a specification.

The specification of the Patent No. 654,535, dated the 14th December, 1909, describes a process for obtaining crystalline zeolites or hydrated alumino-silicates which are easily permeable and do not form colloids or gelatinous solutions, by adding to the melts of alumina-minerals with caustic alkalis or alkali-silicates or carbonates a sufficient quantity of silicic acid, to convert the whole of the alkali into alkali silicate. In that case the formation of crystalline zeolites is therefore due to the addition of silicic acid. Recently I have succeeded in obtaining the said crystalline zeolites having a pronounced interchanging faculty, by the addition to melts containing silica, alumina and alkali, the salts of boracic acid, phosphoric acid, nitric acid, sulfuric acid or other inorganic salts which upon hydration with water can again be leached out of the melt. Eminently suitable for this purpose is boracic acid and its salts.

The composition of the zeolites or hydrated alumino-silicates obtained as described varies according to the proportions of the materials used for the production of the melt.

Among the great number of possible compositions of the melt the following two examples may be mentioned:—

1. The following materials are mixed together, then melted and then extracted with water viz:—

| | | |
|---|---|---|
| Kaolin | 3 | parts by weight. |
| Melted borax | 2.4 | " " " |
| Sodium carbonate | 6.5 | " " " |

After extraction with water there remain behind undissolved crystalline zeolites having a strong faculty of exchanging their constituents.

The composition may be expressed by the formula:—

$$3SiO_2.Al_2O_3.Na_2O$$

the percentage composition being the following: $SiO_2$, 56.2 per cent.; $Al_2O_3$, 31.7 per cent.: NaO, 12.1 per cent.

2. A mixture of:—

| | | |
|---|---|---|
| Kaolin | 2.5 | parts by weight. |
| Melted borax | 1.5 | " " " |
| Sodium carbonate | 5 | " " " |

is melted and thereby crystalline zeolites are produced which will easily interchange their constituents with other components.

If the quantity of inorganic salt or inorganic acid is properly adjusted, the residue, after the melt has been extracted with water, consists entirely of crystalline alumino-silicates, containing water.

Instead of an alkali-carbonate, as in the above example, caustic alkali may be employed.

The products obtained by my present process may be used for the following purposes:—1. For relieving saccharine juices and molasses from the potash and soda mixed with the same and thereby increasing the quantity of sugar which crystallizes out. 2. For softening water intended for the generation of steam or in laundries or dyeworks and other industrial establishments. 3. For removing iron and manganese from water. 4. For removing undesirable bases and salts from water and solutions.

The purification or the softening of water may be effected in a simple manner by filtering the water through a layer of alumino-silicate containing sodium.

The chemical reaction may take place for example, in the manner indicated by the following equation:—

$$2SiO_2.Al_2O_3.Na_2O+CaH_2(CO_3)_2= 2SiO_2.Al_2O_3.CaO+2NaHCO_3.$$

Molasses and saccharine juices containing potash are filtered through alumino-silicates containing calcium in which case the chemical reaction taking place may be expressed for example by the following equation:—

$$2SiO_2.Al_2O_3.CaO+K_2O= 2SiO_2.Al_2O_3.K_2+CaO.$$

What I claim as my invention, and desire to secure by Letters Patent is:—

1. The herein described process for the manufacture of artificial zeolites in a crystallized form, which consists in fusing together alumina silica and an alkali carbonate with a sufficient quantity of an inorganic salt which upon hydration with water can again be leached out of the melt as to insure that on the extraction of the melt with water there remain only crystalline artificial zeolites.

2. The herein described process for the manufacture of artificial zeolites in a crystalline form, which consists in fusing together alumina silica and an alkali-carbonate with a sufficient quantity of a borate to insure that after the extraction of the melt with water there remain only crystalline artificial zeolites.

3. The herein described process for the manufacture of artificial zeolites in a crystalline form, which consists in fusing together alumina silica and an alkali-carbonate with a sufficient quantity of borax to insure that after the extraction of the melt with water there remain only crystalline artificial zeolites.

4. The process for the manufacture of artificial zeolites in a crystalline form, which consists in melting together alumina silica and an alkali-carbonate with the addition of a sufficient quantity of an inorganic salt which upon hydration with water can again be leached out of the melt as to insure that the whole of the alkali will combine with the alumina and subsequently extracting the melt with water substantially as described.

5. The herein described process for the manufacture of artificial zeolites in a crystalline form, which consists in fusing together alumina silica and alkali with a sufficient quantity of an inorganic salt which upon hydration with water can again be leached out of the melt as to insure that on the extraction of the melt with water there remain only crystalline artificial zeolites.

6. The herein described process for the manufacture of artificial zeolites in a crystalline form, which consists in fusing together alumina silica and alkali with a sufficient quantity of borax to insure that after the extraction of the melt with water there remain only crystalline artificial zeolites.

7. The process for the manufacture of artificial zeolites in a crystalline form, which consists in melting together alumina silica and alkali with the addition of a sufficient quantity of an inorganic salt which upon hydration with water can again be leached out of the melt as to insure that the whole of the alkali will combine with the alumina and subsequently extracting the melt with water substantially as described.

8. The herein described process for the manufacture of artificial zeolites in a crystalline form, which consists in fusing together alumina silica and an alkali with a sufficient quantity of a borate to insure that after the extraction of the melt with water there remain only crystalline artificial zeolites.

In testimony whereof I have hereunto signed my name to this specification in the presence of two subscribing witnesses.

DR. ROBERT GANS.

Witnesses:
CORNELIUS MASSACIU,
LUDWIG WERZHÖFFER.